United States Patent
Wakabayashi et al.

(10) Patent No.: US 12,138,865 B2
(45) Date of Patent: Nov. 12, 2024

(54) METHOD FOR MANUFACTURING MOLDED PRODUCT

(71) Applicant: SEIKO EPSON CORPORATION, Tokyo (JP)

(72) Inventors: Shigemi Wakabayashi, Nagano (JP); Masahiko Nakazawa, Nagano (JP); Takashi Hiraiwa, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 268 days.

(21) Appl. No.: 17/690,171

(22) Filed: Mar. 9, 2022

(65) Prior Publication Data
US 2022/0288869 A1    Sep. 15, 2022

(30) Foreign Application Priority Data
Mar. 11, 2021   (JP) ................................ 2021-038976

(51) Int. Cl.
*B29C 70/02*       (2006.01)
*B29K 509/02*      (2006.01)

(52) U.S. Cl.
CPC ........ *B29C 70/025* (2013.01); *B29K 2509/02* (2013.01)

(58) Field of Classification Search
CPC .................................................... B29C 70/025
See application file for complete search history.

(56) References Cited

U.S. PATENT DOCUMENTS

| | | | | |
|---|---|---|---|---|
| 5,234,757 A | * | 8/1993 | Wong | B29B 15/122 428/313.5 |
| 5,269,991 A | * | 12/1993 | Gueret | B44C 5/06 264/40.6 |
| 5,660,900 A | * | 8/1997 | Andersen | B28B 23/0081 428/218 |
| 5,660,901 A | * | 8/1997 | Wong | B29D 7/01 428/36.1 |
| 5,662,731 A | * | 9/1997 | Andersen | B28B 1/00 106/206.1 |
| 5,679,145 A | * | 10/1997 | Andersen | B29C 43/24 106/206.1 |
| 5,683,772 A | * | 11/1997 | Andersen | B29C 39/42 428/53 |
| 5,705,203 A | * | 1/1998 | Andersen | B28B 23/0081 264/327 |

(Continued)

FOREIGN PATENT DOCUMENTS

| | | |
|---|---|---|
| EP | 3 133 197 A1 | 2/2017 |
| EP | 3 281 756 A1 | 2/2018 |

(Continued)

*Primary Examiner* — Andrew D Graham
(74) *Attorney, Agent, or Firm* — Global IP Counselors, LLP

(57) ABSTRACT

The method for manufacturing a molded product of the present disclosure includes a deposition step of depositing a mixture including a fiber and a complex, a humidification step of humidifying the mixture, and a molding step of heating and pressurizing the humidified mixture to obtain a molded product. The complex includes a composite particle in which a binding material particle containing a binding material that exerts a binding force for binding the individual fibers together by being applied with moisture and an inorganic particle are included as a unit.

10 Claims, 3 Drawing Sheets

(56) References Cited

U.S. PATENT DOCUMENTS

| | | | | |
|---|---|---|---|---|
| 5,709,827 A | * | 1/1998 | Andersen | B65D 5/00 |
| | | | | 264/102 |
| 5,738,921 A | * | 4/1998 | Andersen | C08J 9/0085 |
| | | | | 428/36.1 |
| 5,776,388 A | * | 7/1998 | Andersen | B28B 1/52 |
| | | | | 264/129 |
| 5,776,842 A | * | 7/1998 | Wood | B65D 1/0207 |
| | | | | 442/394 |
| 5,783,272 A | * | 7/1998 | Wong | B29C 70/025 |
| | | | | 428/36.1 |
| 5,843,544 A | * | 12/1998 | Andersen | B32B 5/14 |
| | | | | 16/385 |
| 2011/0059319 A1 | * | 3/2011 | Raday | B29C 70/025 |
| | | | | 524/786 |
| 2014/0335325 A1 | * | 11/2014 | Humphries | B29C 39/42 |
| | | | | 428/428 |
| 2020/0031090 A1 | * | 1/2020 | Kurata | D21H 17/71 |
| 2022/0289966 A1 | * | 9/2022 | Sago | B27N 3/04 |
| 2022/0379525 A1 | * | 12/2022 | Adzima | C04B 35/634 |

FOREIGN PATENT DOCUMENTS

| | | |
|---|---|---|
| EP | 3 623 510 A1 | 3/2020 |
| JP | H05-246465 A | 9/1993 |

\* cited by examiner

METHOD FOR MANUFACTURING MOLDED PRODUCT

The present application is based on, and claims priority from JP Application Serial Number 2021-038976, filed Mar. 11, 2021, the disclosure of which is hereby incorporated by reference herein in its entirety.

BACKGROUND

1. Technical Field

The present disclosure relates to a method for manufacturing a molded product.

2. Related Art

Obtaining a sheet-like or film-like molded product by depositing a fibrous material and exerting a binding force between the deposited fibers has been performed for a long time. As a typical example thereof, manufacturing of paper by papermaking using water is mentioned. The paper manufactured by a papermaking method generally, for example, often has a structure in which the fibers of cellulose derived from wood, etc. are entwined with each other and partially bound to each other by a binder.

However, since the papermaking method is a wet method, it is necessary to use a large amount of water. In addition, dehydration, drying, etc. are necessary after formation of paper, and the energy and time to be spent for them are very large. Furthermore, the used water is required to be adequately treated as wastewater. Accordingly, it has become difficult to respond to recent requirements, such as energy saving and environmental protection. In addition, the apparatus to be used for the papermaking method often needs water, electricity, and a large-scale utility such as a drainage facility, and downsizing is difficult.

Accordingly, as a method that does not use a large amount of water unlike known papermaking methods, a method for manufacturing a molded product, such as a buffer material, by adding mist-like water to a cotton-like material obtained by defibration of wastepaper, adding powdery or granular adhesive paste thereto, and performing molding and drying has been proposed (for example, see JP-A-5-246465).

However, as described above, even if a powdery adhesive paste is merely mixed with fibers, it is difficult to uniformly include the adhesive paste, and the resulting molded product may be difficult to sufficiently secure the strength. In particular, when paper is manufactured as a molded product, the paper cannot be stably fed through a printing machine or a printer.

SUMMARY

The present disclosure has been made to solve the above-mentioned problems and can be realized as the following application examples.

The method for manufacturing a molded product according to an application example of the present disclosure is a method for manufacturing a molded product comprising:
 a deposition step of depositing a mixture including a fiber and a complex;
 a humidification step of humidifying the mixture; and
 a molding step of heating and pressurizing the humidified mixture to obtain a molded product, wherein
 the complex includes a composite particle in which a binding material particle containing a binding material that exerts a binding force for binding the individual fibers together by being applied with moisture and an inorganic particle are included as a unit.

DESCRIPTION OF EXEMPLARY EMBODIMENTS

Figure 1:
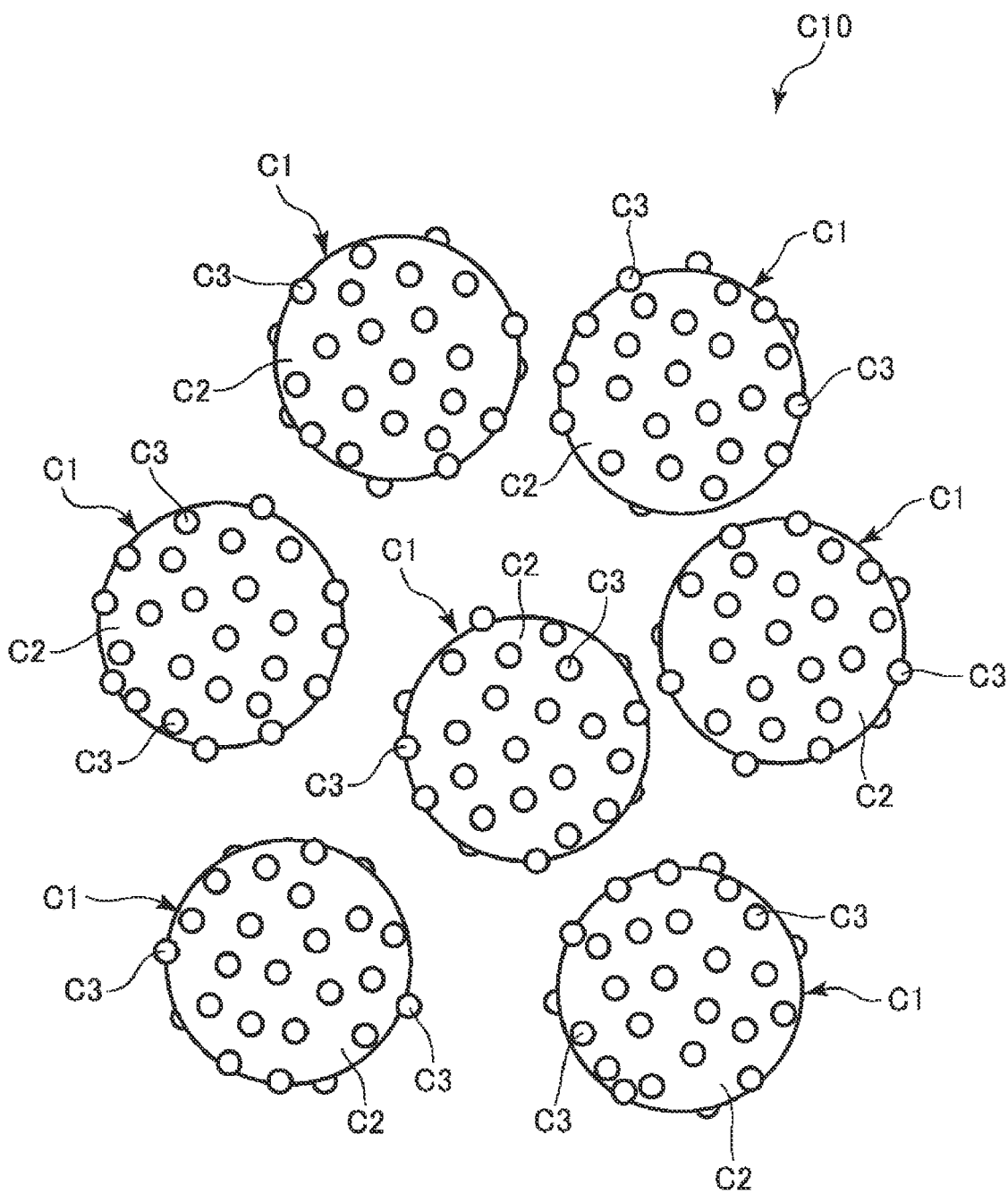
FIG. 1 is a view schematically showing an appropriate embodiment of the complex to be used in the method for manufacturing a molded product of the present disclosure.

Appropriate embodiments of the present disclosure will now be described in detail.

1. Method for Manufacturing Molded Product

A method for manufacturing a molded product of the present disclosure will be first described.

The method for manufacturing a molded product of the present disclosure includes a deposition step of depositing a mixture including a fiber and a complex, a humidification step of humidifying the mixture, and a molding step of heating and pressurizing the humidified mixture to obtain a molded product. The complex includes a binding material particle and an inorganic particle. The binding material particle includes a binding material that exerts a binding force for binding the individual fibers together by being applied with moisture.

Consequently, a molded product including a fiber and having an excellent strength can be manufactured. In addition, a molded product having a desired shape can be suitably manufactured by using only a small amount of water. That is, the method can be suitably applied to a dry molding method. Accordingly, the method is advantageous also from the viewpoint of the productivity and production cost of the molded product, energy saving, downsizing of the facility for manufacturing a molded product, and so on. Incidentally, in the present specification, the "dry molding method" refers to a method in which a raw material for molding is not immersed in a liquid including water in the process of manufacturing a molded product, and a method using a small amount of water, such as a method of spraying a liquid including water to a raw material for molding, etc., is included in the dry molding method.

It is inferred that the excellent effects described above are obtained by the following reasons.

That is, when an inorganic particle is included in addition to a binding material particle, compared to the case of using the binding material particle alone, unintentionally aggregation of individual particles of the binding material particle can be effectively prevented during storage of the binding material or during transportation of the binding material in the process of manufacturing a molded product, and the fiber and the binding material particle can be uniformly mixed in the process of manufacturing a molded product. In addition, a binding force can be exerted by the moisture application by humidification, and a molded product having excellent adhesion between the binding material and the fiber can be obtained. It is thought that as a result, unintentional variation in the content of the binding material in the manufactured molded product can be prevented to impart an excellent strength to the molded product.

Incidentally, as described above, the binding material may be any material that exerts a binding force for binding individual fibers together by being applied with moisture, but the "exerting a binding force" here means that the binding force is obviously increased compared to the case of not being applied with moisture. For example, it does not exclude the case where a relatively weak binding force is obtained when no moisture is applied.

1-1. Deposition Step

In the deposition step, a mixture including a fiber and a complex is deposited.

The mixing ratio of the fiber and the complex in this step is not particularly limited, and the content of the complex in the mixture obtained in this step may be 1 mass % or more and 50 mass % or less, 2 mass % or more and 45 mass % or less, or 3 mass % or more and 40 mass % or less.

Consequently, the molded product can have a further excellent strength while maintaining a sufficiently high content of the fiber in the finally obtained molded product. In addition, the complex in the manufacturing process of the molded product can be more smoothly transported.

In this step, the fiber to be mixed with the complex may be subjected to a humidification treatment in advance prior to, for example, a humidification step described later, i.e., a step of performing a humidification treatment to the mixture. In addition, the fiber may be humidified between the mixing with the complex and the deposition of the mixture obtained by the mixing.

In the case as described above, the water content in the fiber that is subjected to this step may be 0.1 mass % or more and 12 mass % or less, 0.2 mass % or more and 10 mass % or less, or 0.3 mass % or more and 9.0 mass % or less.

Consequently, for example, before this step, a harmful effect of static electricity on the fiber, for example, adhesion of the fiber to the wall surface, etc. of the manufacturing apparatus of a molded product due to static electricity, can be effectively prevented. In addition, the fiber and the complex can be more uniformly mixed.

1-1-1. Fiber

The fiber is usually the main component of the molded product manufactured by the method for manufacturing a molded product of the present disclosure and is a component of highly contributing to maintain the shape of the molded product and of highly affecting the characteristics, such as the strength of the molded product.

The fiber may be constituted of any material and may be a material that can maintain the fibrous state even by heating in the molding step.

In particular, the fiber may be constituted of a material including at least one chemical structure selected from a hydroxy group, a carbonyl group, and an amino group.

Consequently, for example, when starch is used as the binding material, a hydrogen bond is likely to form between the fiber and the binding material, resulting in a more excellent binding strength between the fiber and the binding material and a more excellent strength as the whole molded product, for example, a more excellent tensile strength of a sheet-like molded product.

The fiber may be a synthetic fiber constituted of a synthetic resin, such as polypropylene, polyester, or polyurethane, but can be a naturally derived fiber, i.e., a biomass-derived fiber or a cellulose fiber.

Consequently, it is possible to more suitably correspond to environmental problems, saving of underground resources, and so on.

In particular, when the fiber is a cellulose fiber, the following effects are also obtained.

That is, cellulose is a plant-derived and abundant natural material, and the use of cellulose as the fiber further suitably corresponds to environmental problems, saving of reserve resources, and so on, and cellulose may be used from the viewpoint of stably supply of a molded product, a reduction in cost, and so on. In addition, among various types of fibers, the cellulose fiber theoretically has a particularly high strength and is advantageous also from the viewpoint of further enhancing the strength of the molded product.

The cellulose fiber is usually mainly constituted of cellulose but may include a component other than cellulose. Examples of such the component include hemicellulose and lignin.

In addition, the cellulose fiber may be one subjected to a treatment, such as bleaching.

In addition, the fiber may be one subjected to a treatment, such as an UV irradiation treatment, an ozone treatment, or a plasma treatment. Consequently, the hydrophilicity of the fiber can be enhanced, and the affinity with the binding material can be enhanced. More specifically, a functional group, such as a hydroxy group, can be introduced to the surface of a fiber by these treatments, and a hydrogen bond with the binding material can be more efficiently formed.

The average length of the fiber is not particularly limited and may be 0.1 mm or more and 50 mm or less, 0.2 mm or more and 5.0 mm or less, or 0.3 mm or more and 3.0 mm or less.

Consequently, the stability of the shape, strength, etc. of the manufactured molded product can be further improved.

The average thickness of the fiber is not particularly limited and may be 0.005 mm or more and 0.5 mm or less or 0.010 mm or more and 0.05 mm or less.

Consequently, the stability of the shape, strength, etc. of the manufactured molded product can be further improved. In addition, it is possible to more effectively prevent unintentional irregularities occurring on the surface of the molded product.

The average aspect ratio, i.e., the ratio of the average length to the average thickness, of the fiber is not particularly limited and may be 10 or more and 1000 or less or 15 or more and 500 or less.

Consequently, the stability of the shape, strength, etc. of the manufactured molded product can be further improved. In addition, it is possible to more effectively prevent unintentional irregularities occurring on the surface of the manufactured molded product.

1-1-2. Complex

The complex to be mixed with the fiber will now be described in detail.

FIG. 1 is a view schematically showing a suitable embodiment of the complex to be used in the method for manufacturing a molded product of the present disclosure.

As described above, a complex C10 includes a composite particle C1 in which a binding material particle C2 and an inorganic particle C3 are included as a unit. The binding material particle C2 contains a binding material exerting a binding force for binding individual fibers together by being applied with moisture. Incidentally, in the present disclosure, the state of forming a composite particle C1 by adhesion of at least a part of the inorganic particle C3 to the surface or the inside of the binding material particle C2 is referred to as "including as a unit", and it is not intended to exclude the complex C10 including the binding material particle C2 and the inorganic particle C3 that do not form the composite particle C1.

In particular, in the configuration shown in the view, the composite particle C1 included in the complex C10 includes an inorganic particle C3 adhered to the surface of a binding material particle C2.

Consequently, a repulsive force acts between individual particles of the inorganic particle C3, and aggregation of individual particles of the binding material particle C2 is less likely to occur. Incidentally, the arrangement of the inorganic particles C3 can be confirmed with, for example, various electron microscopes.

1-1-2-1. Composite Particle

Although the composite particle C1 included in the complex C10 may be composed of a single particle of the binding material particle C2 and a single particle of the inorganic particle C3 adhered to the surface of the binding material particle C2, the complex C10 includes a particle as the composite particle C1 composed of a single particle of the binding material particle C2 and a plurality of particles of the inorganic particle C3 adhered to the surface of the binding material particle C2.

Consequently, the effects described above are more remarkably exerted.

The average particle diameter of the composite particle C1 may be 1.0 μm or more and 100 μm or less, 2.0 μm or more and 70 μm or less, or 3.0 μm or more and 50 μm or less.

Consequently, the effects described above are more remarkably exerted.

Incidentally, in the present specification, the term "average particle diameter" refers to the median diameter (D50 value of 50% cumulative frequency) unless otherwise specified. The average particle diameter can be determined by measurement using, for example, a Microtrac UPA (manufactured by Nikkiso Co., Ltd.).

1-1-2-1-1. Binding Material Particle

The binding material particle C2 includes a binding material exerting a binding force for binding the individual fibers together by being applied with moisture.

Examples of the binding material constituting the binding material particle C2 include naturally derived components, such as starch, dextrin, collagen, amylose, hyaluronic acid, kudzu, konjak, potato starch, etherified starch, esterified starch, natural gum paste (etherified tamarind gum, etherified locust bean gum, etherified guar gum, and acacia arabic gum), fiber derivative paste (etherified carboxymethyl cellulose, hydroxyethyl cellulose), seaweed (sodium alginate, agar), and animal proteins (collagen, gelatin, hydrolyzed collagen, sericin); and polyvinyl alcohol, polyacrylic acid, and polyacrylamide. One or a combination of two or more selected from these materials can be used, and a naturally derived component or starch may be used.

Consequently, the excellent effects of the present disclosure described above can be obtained while suppressing the use of petroleum-derived materials and reducing the amount of $CO_2$ emission. In addition, these materials are excellent also in biodegradability.

In particular, starch is a material that suitably exerts a binding force by progress of gelatinization by heating after application with moisture, i.e., a binding material that suitably exerts a binding force for binding individual fibers together by being applied with moisture. In addition, starch exerts a binding force by a noncovalent bond, such as a hydrogen bond, between fibers, in particular, fibers, such as cellulose fibers, constituted of a material having a functional group, such as a hydroxy group, and starch has an excellent binding force with fibers and shows excellent coatability for fibers. It is accordingly possible to more improve the strength, etc. of the molded product manufactured using the complex C10.

In particular, the binding material may be starch having a weight average molecular weight of 50,000 or more and 400,000 or less.

Consequently, the binding material can have more excellent water absorption efficiency, and even when the moisture application amount is less, a molded product with a sufficient strength can be manufactured. More specifically, even when a small amount of water is applied, gelatinization by heating suitably progresses, the productivity of the molded product using the complex C10 becomes excellent, and the produced molded product can have, for example, an excellent strength. In addition, the starch having a prescribed molecular weight as described above is particularly unlikely to cause unintentional denaturation by moisture application.

The starch of which the weight average molecular weight thus controlled to a value within a prescribed range can be suitably obtained by, for example, as follows. For example, natural starch is suspended in water, and sulfuric acid, hydrochloric acid, or sodium hypochlorite is then acted on the suspension under a condition of not gelatinizing the starch to obtain starch controlled to have a weight average molecular weight within a prescribed range. Alternatively, starch controlled to have a weight average molecular weight within a prescribed range can be obtained by, for example, heating natural starch to 120° C. to 180° C. directly or after addition of a very small amount of volatile acid, such as hydrochloric acid, diluted with water, thoroughly mixing, maturing, and drying at a low temperature. In addition, starch controlled to have a weight average molecular weight within a prescribed range can be obtained by, for example, heating natural starch together with water and subjecting the resulting paste liquid to a hydrolysis treatment with an acid or an enzyme.

As described above, the weight average molecular weight of the starch as the binding material may be 50,000 or more and 400,000 or less, 70,000 or more and 300,000 or less, or 80,000 or more and 200,000 or less.

Consequently, the effects described above are more remarkably exerted.

Incidentally, the weight average molecular weight of starch can be determined by measurement by gel permeation chromatography. The weight average molecular weights shown in Examples described later are also values determined by measurement by gel permeation chromatography.

The starch is a high polymeric material in which a plurality of α-glucose molecules are polymerized by glycoside bonds.

The starch includes at least one of amylose and amylopectin.

The binding material particle C2 may include, in addition to the binding material, a component other than the binding material, that is, a component that does not exert a binding force for binding individual fibers together even if being applied with moisture. Examples of such the component include a fiber material and a color material, such as a pigment, a dye, and a toner.

However, the content of the binding material in the binding material particle C2 may be 80 mass % or more, 90 mass % or more, or 95 mass % or more.

The average particle diameter of the binding material particle C2 may be 1.0 μm or more and 50 μm or less, 3.0 μm or more and 40 μm or less, or 5.0 μm or more and 30 μm or less.

Consequently, the fiber and the complex C10 can be uniformly mixed, the moisture absorption in the humidification step more smoothly progresses, and the finally obtained molded product can have more excellent strength and reliability. In addition, when the particle diameter of the binding material particle C2 is thus relatively small, the ratio of the surface area to the mass of the binding material particle C2 becomes large, and the water absorption efficiency of the binding material is further improved. As a result, even when the moisture application amount is less, a molded product with a sufficient strength can be manufactured. In addition, the fluidity and ease of handling of the complex C10 are further improved. In addition, when a binding material particle having a small average particle diameter does not thus coexist with the inorganic particle, aggregation of the binding material particle particularly tends to occur. However, in the present disclosure, such a problem can be suitably prevented by using a complex in which an inorganic particle coexists with a binding material particle. That is, when the average particle diameter of the binding material particle C2 is within the above-mentioned range, the effects of the present disclosure are more remarkably exerted.

The complex C10 may include the binding material particle C2 to which the inorganic particle C3 does not adhere, in other words, the binding material particle C2 not constituting the composite particle C1 may be included, but the proportion of the binding material particle C2 constituting the composite particle C1 in the whole binding material particle C2 included in the complex C10 can be 50 mass % or more, 60 mass % or more, or 70 mass % or more.

Consequently, the above-described effects of the present disclosure are more remarkably exerted.

1-1-2-1-2. Inorganic Particle

The composite particle C1 includes the inorganic particle C3.

The average particle diameter of the inorganic particle C3 may be 1 nm or more and 20 nm or less or 5 nm or more and 18 nm or less.

Consequently, the above-described effects by including the inorganic particle C3 are more remarkably exerted. In addition, excessive irregularities can be suitably prevented from being generated on the surface of the composite particle C1 composed of the binding material particle C2 and the inorganic particle C3 adhered to the surface of the binding material particle C2, and the complex C10 can have more excellent fluidity. In addition, the inorganic particle C3 is allowed to more suitably adhere to the surface of the binding material particle C2, unintentional detachment of the inorganic particle C3 from the surface of the binding material particle C2 and unintentional burying of the inorganic particle C3 into the inside of the binding material particle C2 can be more suitably prevented, and the above-described effects by including the composite particle C1 can be more remarkably exerted.

The complex C10 may include the inorganic particle C3 not adhering to the binding material particle C2, in other words, may include the inorganic particle C3 not constituting the composite particle C1, but the proportion of the inorganic particle C3 constituting the composite particle C1 in the whole inorganic particle C3 included in the complex C10 may be 50 mass % or more, 60 mass % or more, or 70 mass % or more.

Consequently, the above-described effects of the present disclosure are more remarkably exerted.

The inorganic particle C3 may be mainly constituted of an inorganic material. In addition, the inorganic particle C3 may have substantially the same composition at each position or may have positions having different compositions.

More specifically, for example, the mother particle of the inorganic particle C3 may be surface-treated with at least one surface treatment agent. In other words, the inorganic particle C3 may include a mother particle constituted of an inorganic material and a coating layer of a surface treatment agent coating the mother particle.

Consequently, for example, the unintentional aggregation of the binding material particle C2 is further effectively prevented, the wet spread of the binding material on the fiber surface in the molding step are more improved, and the finally obtained molded product can have a more excellent strength.

The case in which the inorganic particle C3 included in the complex C10 is a particle including a mother particle constituted of an inorganic material and a coating layer made of a surface treatment agent coating the mother particle will be mainly described below.

1-1-2-1-2-1. Mother Particle

The mother particle of the inorganic particle C3, in other words, the base material surface-treated with the surface treatment agent of the inorganic particle C3 is constituted of an inorganic material.

Consequently, the inorganic particle C3 can have more excellent heat resistance, and the above-described effects can be more certainly exerted.

Examples of the constituent material of the mother particle of the inorganic particle C3 include various metal materials, various metal compounds, various glass materials, and various carbon materials.

Examples of the metal material include single metals, such as Fe, Al, Cu, Ag, and Ni, and alloys including at least one of these metals.

Examples of the metal compound include metal oxides, metal nitrides, metal carbides, and metal sulfides, more specifically, silica, alumina, zirconia, titanium oxide, magnetite, and ferrite.

Examples of the glass material include soda glass, crystalline glass, quartz glass, lead glass, potassium glass, borosilicate glass, and non-alkali glass.

Examples of the carbon material include diamond, carbon fibers, carbon black, carbon nanotubes, carbon nanofibers, and fullerene.

In particular, the constituent material of the mother particle of the inorganic particle C3 may be silica. In other words, the inorganic particle C3 may be constituted of a material including silica.

Consequently, the surface treatment with a surface treatment agent for the mother particle can be more suitably performed, and the adhesion between the mother particle and the surface treatment agent can be further improved. As a result, the effects described above are more remarkably exerted. In addition, silica is a material that is unlikely to adversely affect the color of the molded product manufactured using the complex C10. In particular, when the molded product is paper, this effect is more remarkably exerted.

The mother particle of the inorganic particle C3 may include an organic material in addition to the inorganic material as long as it is mainly constituted of the above-mentioned inorganic material.

However, the content of the inorganic material in the mother particle of the inorganic particle C3 may be 90 mass % or more, 92 mass % or more, or 95 mass % or more.

1-1-2-1-2-2. Surface Treatment Agent

As described above, the inorganic particle C3 may include a mother particle constituted of an inorganic material and a coating layer of a surface treatment agent coating the mother particle.

Preferred examples of the surface treatment agent include fluorine-containing compounds and silicon-containing compounds. The use of such a surface treatment agent can more suitably prevent aggregation of the binding material particle C2 and the composite particle C1. In addition, the fluidity and ease of handling of the complex C10 are improved by including the inorganic particle C3 surface-treated with the surface treatment agent mentioned above. Consequently, the productivity of the molded product can be particularly improved. In addition, the surface free energy of the inorganic particle C3 can be more efficiently decreased. As a result, in the molding step, the complex C10 is likely to more suitably wet and spread on the surface of the fiber. Consequently, in the finally obtained molded product, the adhesion between the fiber and the binding material is further improved, and the molded product can have a more excellent strength.

Examples of the fluorine-containing compound include perfluoropolyether and fluorine-modified silicone oil.

Examples of the silicon-containing compound include polydimethylsiloxane having a trimethylsilyl terminus, polydimethylsiloxane having a hydroxy terminus, polymethylphenylsiloxane, and various silicone oils, such as amino-modified silicone oil, epoxy-modified silicone oil, carboxy-modified silicone oil, carbinol-modified silicone oil, polyether-modified silicone oil, and alkyl-modified silicone oil.

In particular, the surface treatment agent may be polydimethylsiloxane having a trimethylsilyl terminus. In other words, the inorganic particle may be one including a trimethylsilyl group on the surface.

Consequently, aggregation of the composite particle C1, the binding material particle C2, and the inorganic particle C3 can be more effectively prevented.

When the surface treatment agent is used, one type of the surface treatment agent may be used, or a plurality of types of the surface treatment agents may be used.

When a plurality of types of the surface treatment agents is used, the surface treatment agents may be used for a single mother particle, or the complex C10 may include particles of the inorganic particle C3 treated with surface treatment agents different from each other.

The content of the surface treatment agent based on 100 parts by mass of the mother particle included in the complex C10 may be 0.5 parts by mass or more and 7 parts by mass or less or 1 part by mass or more and 5 parts by mass or less.

Consequently, the above-described effects of the present disclosure are more remarkably exerted.

1-1-2-2. Other Configurations

The complex C10 may include the above-described composite particle C1 and may further include another configuration. For example, the complex C10 may include the binding material particle C2 to which the inorganic particle C3 does not adhere or the inorganic particle C3 not adhering to the binding material particle C2, in addition to the above-described composite particle C1.

However, the content of the composite particle C1 in the complex C10 may be 50 mass % or more, 70 mass % or more, or 80 mass % or more.

Consequently, the above-described effects are more remarkably exerted.

1-1-2-3. Other Conditions

The complex C10 may satisfy the following conditions.

For example, the content of the binding material particle C2 in the complex C10 may be 90.0 mass % or more and 99.9 mass % or less, 95.0 mass % or more and 99.7 mass % or less, or 97.0 mass % or more and 99.4 mass % or less.

Consequently, the above-described effects are more remarkably exerted.

The content of the inorganic particle C3 in the complex C10 may be 0.1 mass % or more and 10.0 mass % or less, 0.3 mass % or more and 5.0 mass % or less, or 0.6 mass % or more and 3.0 mass % or less.

Consequently, the effects by including the inorganic particle C3 described above are more remarkably exerted, and, for example, the complex C10 can have more excellent fluidity, and the finally obtained molded product can have a more excellent strength.

1-2. Humidification Step

In the humidification step, the deposited mixture, i.e., the mixture including the fiber and the complex C10 is humidified.

Consequently, in the molding step described later, the binding strength between the fiber and the binding material and the binding strength between the individual fibers via starch can be improved, and the finally obtained molded product can have sufficiently excellent strength and so on. In addition, the molding in the molding step can be suitably performed under relatively mild conditions.

The method for humidifying the mixture is not particularly limited and may be performed in non-contact with the mixture. Examples thereof include a method of placing the mixture in a high humidity atmosphere, a method of allowing the mixture to pass through a high humidity space, a method of spraying a mist of liquid containing water to the mixture, and a method of allowing the mixture to pass through a space where a mist of liquid containing water floats, and one method or a combination of two or more methods selected from these methods can be performed. More specifically, the mixture can be humidified by, for example, using various humidifiers, such as a vaporization type and an ultrasonic type. The humidification of the mixture may be performed, for example, in a plurality of steps in the process of manufacturing a molded product. Incidentally, the liquid containing water may include, for example, a preservative, a fungicide, and a pesticide.

The amount of moisture to be applied to the mixture in the humidification step is not particularly limited, and the moisture may be applied in an amount of 1 part by mass or more and 50 parts by mass or less based on 100 parts by mass of the mixture to be subjected to the humidification step or in an amount of 5 parts by mass or more and 40 parts by mass or less or 10 parts by mass or more and 30 parts by mass or less.

Consequently, a molded product with a sufficient strength can be manufactured with a remarkably small amount of moisture compared to that in known papermaking methods, and the effects of the present disclosure can be more remarkably exerted.

1-3. Molding Step

In the molding step, the mixture humidified in the humidification step is heated and pressurized.

Consequently, a molded product is obtained. Incidentally, the humidification step and the molding step may be simultaneously performed.

The heating temperature in the molding step is not particularly limited and may be 60° C. or more and 250° C. or less, 70° C. or more and 200° C. or less, or 80° C. or more and 170° C. or less.

Consequently, more suitable wet spread of the complex C10 on the surface of the fiber is possible while effectively preventing unintentional degradation, denaturation, etc. of the fiber and the components of the complex C10. As a result, the manufactured molded product can have more excellent strength and reliability. In addition, such heating is advantageous also from the viewpoint of energy saving. In particular, when the binding material particle C2 is constituted of a material including starch as the binding material, it is possible to suitably proceed with gelatinization of the water-absorbed starch, and unintentional degradation, etc. of the constituent material of the molded product can be effectively prevented.

The pressure to be applied to the mixture in the molding step is not particularly limited and may be 0.1 MPa or more and 100 MPa or less or 0.3 MPa or more and 80 MPa or less.

Consequently, the complex C10 can more suitably wet and spread on the surface of the fiber. As a result, the manufactured molded product can have more excellent strength.

Consequently, the complex C10 can be more suitably wet and spread on the surface of the fiber while effectively preventing unintentional degradation, denaturation, etc. of the fiber and the components of the complex C10. As a result, the manufactured molded product can have more excellent strength and reliability. In addition, such pressurization is advantageous also from the viewpoint of energy saving.

This step can be performed, for example, using a heat press, a heat roller, or the like.

The method for manufacturing a molded product of the present disclosure can be suitably implemented using, for example, a manufacturing apparatus of a molded product described below.

2. Manufacturing Apparatus of a Molded Product

A manufacturing apparatus of a molded product according to the present disclosure will now be described.

Figure 2:
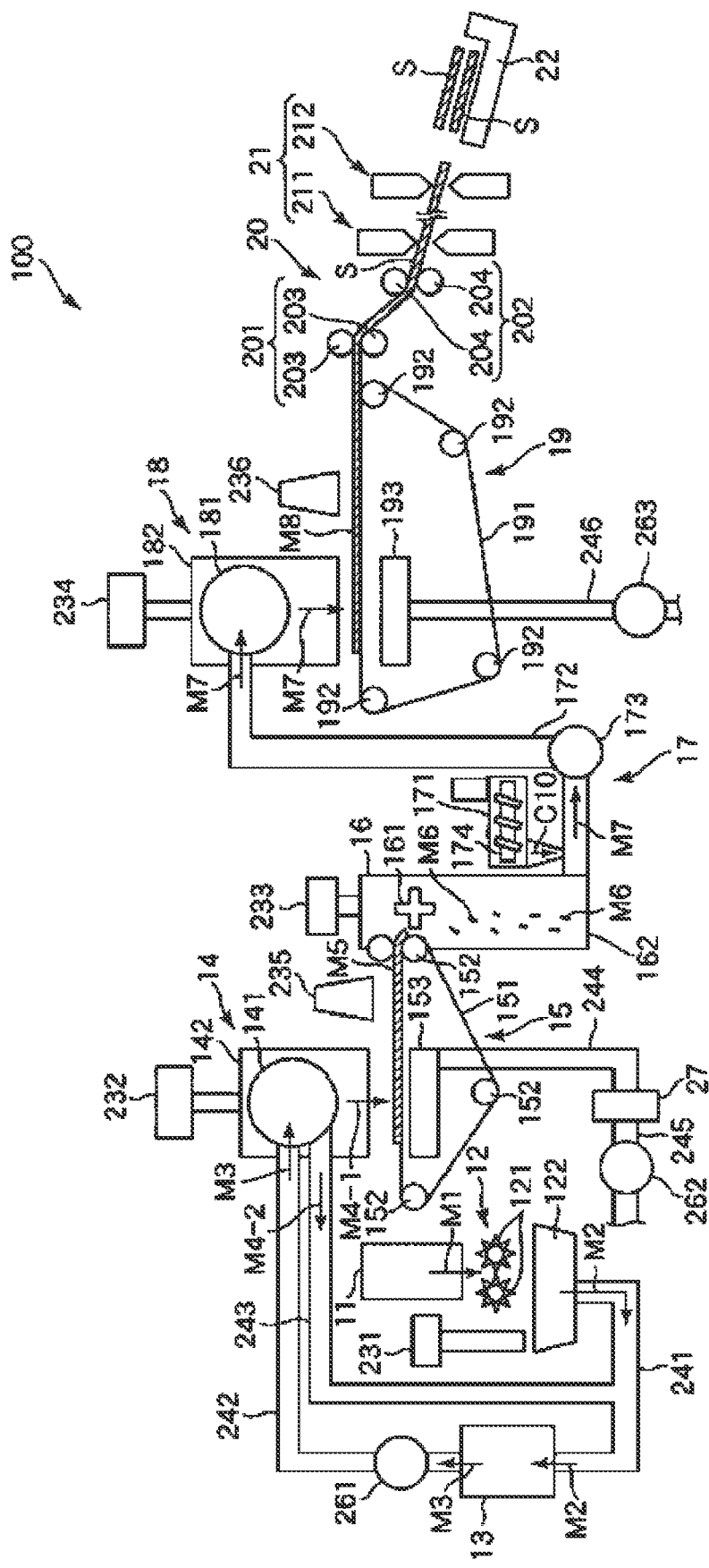
FIG. 2 is a schematic side view illustrating the structure of a manufacturing apparatus of a molded product of an appropriate embodiment.
Figure 3:
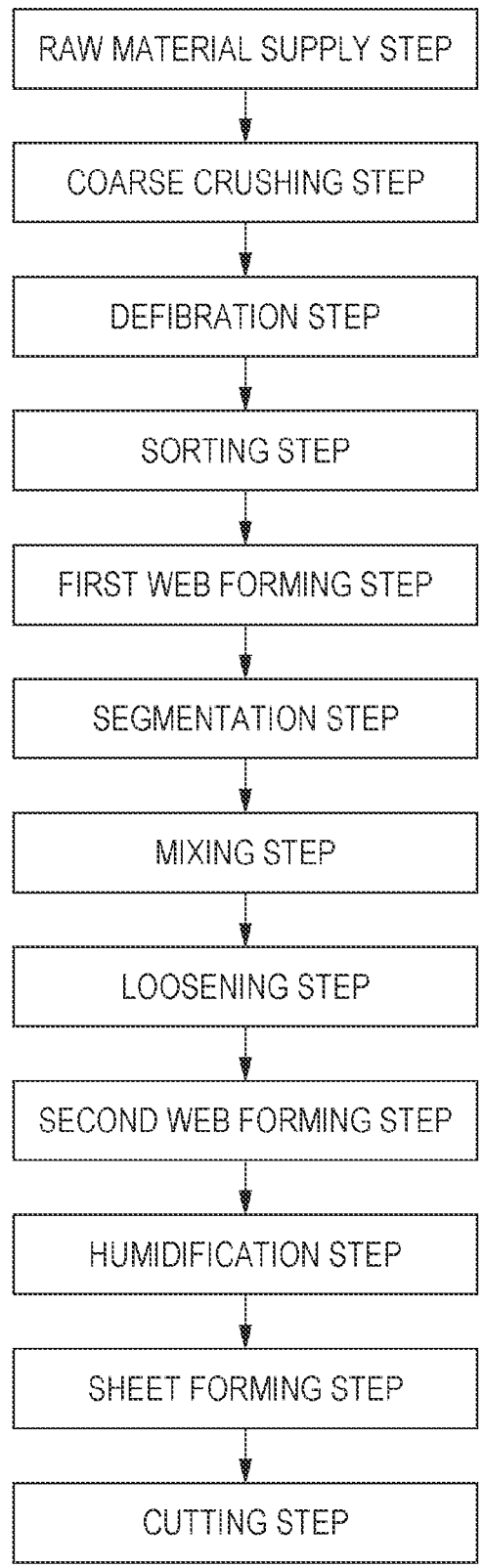
FIG. 3 is a drawing showing the steps implemented sequentially by the manufacturing apparatus of a molded product shown in FIG. 2.

FIG. 2 is a schematic side view illustrating the structure of a manufacturing apparatus of a molded product of an appropriate embodiment. FIG. 3 is a drawing showing the steps implemented sequentially by the manufacturing apparatus of a molded product shown in FIG. 2. Incidentally, in the following, for convenience of description, the upper side in FIG. 2 is referred to as "upper" or "above", the lower side is referred to as "lower" or "below", the left side is referred to as "left" or "upstream", and the right side is referred to as "right" or "downstream".

In the following description, as an example of the manufacturing apparatus of a molded product, a sheet-manufacturing apparatus for manufacturing a sheet as the molded product will be described as an example.

As shown in FIG. 2, the sheet-manufacturing apparatus 100 as the manufacturing apparatus of a molded product includes a raw material supply unit 11, a coarse crushing unit 12, a defibration unit 13, a sorting unit 14, a first web forming unit 15, a fragmentation unit 16, a mixing unit 17, a loosening unit 18, a second web forming unit 19, a sheet forming unit 20, a cutting unit 21, and a stock unit 22. In addition, the sheet-manufacturing apparatus 100 includes a humidification unit 231, a humidification unit 232, a humidification unit 233, and a humidification unit 234.

The operation of each unit of the sheet-manufacturing apparatus 100 is controlled by a controller unit (not shown).

As shown in FIG. 3, in the present embodiment, the method for manufacturing a sheet as the molded product includes a raw material supply step, a coarse crushing step, a defibration step, a sorting step, a first web forming step, a segmentation step, a mixing step, a loosening step, a second web forming step, a humidification step, a sheet forming step, and a cutting step. The sheet-manufacturing apparatus 100 can implement these steps sequentially.

The structure of each unit of the sheet-manufacturing apparatus 100 will now be described.

The raw material supply unit 11 is a section for performing the raw material supply step of supplying a sheet-like material M1 to the coarse crushing unit 12. This sheet-like material M1 is a sheet-like material including a fiber such as a cellulose fiber.

The coarse crushing unit 12 is a section for performing the coarse crushing step of coarsely crushing the sheet-like material M1 supplied from the raw material supply unit 11 in a gas, such as air. The coarse crushing unit 12 includes a pair of primary crushing blades 121 and a hopper 122.

The pair of primary crushing blades 121 rotate to the opposite directions to each other and can coarsely crush, i.e., cut the sheet-like material M1 therebetween into coarsely crushed pieces M2. The shape and size of the coarsely crushed pieces M2 may be those suitable for the defibration treatment in the defibration unit 13 and may be, for example, small pieces with a side length of 100 mm or less or small pieces with a side length of 10 mm or more and 70 mm or less.

The hopper 122 is disposed below the pair of primary crushing blades 121 and may be, for example, funnel shaped. Consequently, the hopper 122 can receive the coarsely crushed pieces M2 crushed by and falling from the primary crushing blades 121.

The humidification unit 231 is disposed above the hopper 122 to be adjacent to the pair of primary crushing blades 121. The humidification unit 231 humidifies the coarsely crushed pieces M2 in the hopper 122. This humidification unit 231 includes a filter (not shown) including moisture and is constituted of a vaporization humidifier in which humidified air having an increased humidity by allowing air to pass through the filter is supplied to the coarsely crushed pieces M2. The supply of humidified air to the coarsely crushed pieces M2 can prevent the coarsely crushed pieces M2 from adhering to the hopper 122 and so on by static electricity.

The hopper 122 is connected to the defibration unit 13 through a tube 241 serving as a flow channel. The coarsely crushed pieces M2 collected in the hopper 122 passes through the tube 241 and is transported to the defibration unit 13.

The defibration unit 13 is a section for performing the defibration step of defibrating the coarsely crushed pieces M2 in a gas, such as air, i.e., by a dry process. A defibrated substance M3 is generated from the coarsely crushed pieces M2 by a defibration treatment in this defibration unit 13. Here, the term "defibration" means that a coarsely crushed piece M2 composed of multiple fibers bound to each other is loosened into individual fibers. This loosened material is the defibrated substance M3. The shape of the defibrated substance M3 is linear or strip-shaped. The individual defibrated substances M3 may exist in a state of being intertwined and agglomerated, that is, in a state of forming a so-called "lump".

The defibration unit 13 consists, for example, in the present embodiment, of an impeller mill including a rotor rotating at a high speed and a liner located on the outer circumference of the rotor. The coarsely crushed pieces M2 flowed into the defibration unit 13 are sandwiched between the rotor and the liner and are defibrated.

The defibration unit 13 can generate a flow of air from the coarse crushing unit 12 toward the sorting unit 14, i.e., an airflow, by the rotation of the rotor.

Consequently, the coarsely crushed pieces M2 can be sucked from the tube 241 to the defibration unit 13. In addition, after the defibration treatment, the defibrated substance M3 can be sent to the sorting unit 14 through a tube 242.

In the middle of the tube 242, a blower 261 is provided. The blower 261 is an airflow generator that generates an airflow toward the sorting unit 14. Consequently, the sending out of the defibrated substance M3 to the sorting unit 14 is promoted.

The sorting unit 14 is a section for performing the sorting step of sorting the defibrated substance M3 depending on the length of the individual fibers. In the sorting unit 14, the defibrated substance M3 is sorted into a first sorted substance M4-1 and a second sorted substance M4-2 larger than the first sorted substance M4-1. The first sorted substance M4-1 has a size suitable for subsequent manufacturing of a sheet S. The second sorted substance M4-2 includes, for example, an insufficiently defibrated substance and excessively aggregated product of the defibrated individual fibers.

The sorting unit 14 includes a drum section 141 and a housing section 142 accommodating the drum section 141.

The drum section 141 is a sieve that is constituted of a cylindrically shaped net and rotates around the central axis thereof. The defibrated substance M3 flows into this drum section 141 and is sorted by the rotation of the drum section 141. The defibrated substance M3 smaller than the opening of the net is sorted as the first sorted substance M4-1, and the defibrated substance M3 equal to or larger than the opening of the net is sorted as the second sorted substance M4-2. The first sorted substance M4-1 falls from the drum section 141.

On the other hand, the second sorted substance M4-2 is sent to a tube 243 which is a flow channel connected to the drum section 141. The tube 243 is connected to the tube 241 on the opposite side to the drum section 141, i.e., the upstream. This second sorted substance M4-2 passed through this tube 243 joins to the coarsely crushed pieces M2 in the tube 241 and flows into the defibration unit 13 together with the coarsely crushed pieces M2. Consequently, the second sorted substance M4-2 is sent back to the defibration unit 13 and is subjected to the defibration treatment together with the coarsely crushed pieces M2.

The first sorted substance M4-1 from the drum section 141 falls while being dispersed in air toward the first web forming unit 15 which is a separation section located below the drum section 141. The first web forming unit 15 is a section performing the first web forming step of forming a first web M5 from the first sorted substance M4-1. The first web forming unit 15 includes a mesh belt 151 serving as a separation belt, three stretching rollers 152, and a suction section 153.

The mesh belt 151 is an endless belt, and the first sorted substance M4-1 deposits thereon. This mesh belt 151 is put around the three stretching rollers 152. The first sorted substance M4-1 on the mesh belt 151 is transported to the downstream by rotary drive of the stretching rollers 152.

The first sorted substance M4-1 has a size equal to or larger than the opening of the mesh belt 151. Consequently, the first sorted substance M4-1 is restricted from passing through the mesh belt 151 and can therefore deposit on the mesh belt 151. The first sorted substance M4-1 is transported to the downstream together with the mesh belt while being deposited on the mesh belt 151 and is therefore formed into a layered first web M5.

There is a risk of, for example, contaminating the first sorted substance M4-1 with dust, mote, and so on. The dust and mote may be mixed with the first sorted substance M4-1, for example, together with the sheet-like material M1 when the sheet-like material M1 is supplied to the coarse crushing unit 12 from the raw material supply unit 11. This dust and mote are smaller than the opening of the mesh belt 151. Consequently, dust and mote pass through the mesh belt 151 and further fall down.

The suction section 153 can suck air from the below of the mesh belt 151. Consequently, the dust and mote passed through the mesh belt 151 can be sucked together with air.

The suction section 153 is connected to a collection section 27 through a tube 244 serving as a flow channel. The dust and mote sucked in the suction section 153 are collected in the collection section 27.

The collection section 27 is further connected to a tube 245 serving as a flow channel. In the middle of the tube 245, a blower 262 is provided. By operating this blower 262, a suction force can be generated in the suction section 153. Consequently, formation of a first web M5 on the mesh belt 151 is promoted. In this first web M5, dust and mote have been removed. Dust and mote pass through the tube 244 by operation of the blower 262 and reach the collection section 27.

The housing section 142 is connected to the humidification unit 232. The humidification unit 232 is constituted of a vaporization humidifier similar to the humidification unit 231. Consequently, humidified air is supplied to the inside of the housing section 142. The first sorted substance M4-1 can be humidified by this humidified air. Accordingly, it is also possible to prevent the first sorted substance M4-1 from adhering to the inner wall of the housing section 142 by an electrostatic force.

The humidification unit 235 is disposed on the downstream of the sorting unit 14. The humidification unit 235 is constituted of an ultrasonic humidifier that sprays water. Consequently, moisture can be supplied to the first web M5, and the amount of moisture of the first web M5 is adjusted. This adjustment can prevent the first web M5 from attaching to the mesh belt 151 by an electrostatic force. Consequently, the first web M5 is easily peeled off from the mesh belt 151 at the position where the mesh belt 151 is folded back by the stretching roller 152.

The fragmentation unit 16 is disposed on the downstream of the humidification unit 235. The fragmentation unit 16 is a section for performing the segmentation step of segmenting the first web M5 peeled off from the mesh belt 151. The fragmentation unit 16 includes a rotatably supported propeller 161 and a housing section 162 accommodating the propeller 161. The first web M5 can be segmented by being wound in the rotating propeller 161. The segmented first web M5 becomes a fragment M6. The fragment M6 descends in the housing section 162.

The housing section 162 is connected to the humidification unit 233. The humidification unit 233 is constituted of a vaporization humidifier similar to the humidification unit 231. Consequently, humidified air is supplied to the inside of the housing section 162. This humidified air can prevent the fragment M6 from adhering to the propeller 161 and the inner wall of the housing section 162 by an electrostatic force.

The mixing unit 17 is disposed on the downstream of the fragmentation unit 16. The mixing unit 17 is a section for performing the mixing step of mixing the fragment M6 and the above-described complex C10. This mixing unit 17 includes a complex supply section 171, a tube 172 serving as a flow channel, and a blower 173.

The tube 172 connects between the housing section 162 of the fragmentation unit 16 and the housing section 182 of the loosening unit 18 and is a flow channel through which the mixture M7 of the fragment M6 and the complex C10 passes.

In the middle of the tube 172, the complex supply section 171 is connected. The complex supply section 171 includes a screw feeder 174. The complex C10 can be supplied to the tube 172 by rotary drive of this screw feeder 174. The complex C10 supplied to the tube 172 is mixed with the fragment M6 to form a mixture M7.

Incidentally, the complex supply section 171 may supply, in addition to the complex C10, for example, a colorant for coloring the fiber, an aggregation inhibitor for inhibiting aggregation of the fiber and aggregation of the complex C10, and a flame retardant for making the fiber, etc. difficult to burn.

In the middle of the tube 172, a blower 173 is provided on the downstream of the complex supply section 171. The blower 173 can generate an airflow toward the loosening unit 18. This airflow can stir the fragment M6 and the complex C10 in the tube 172. Consequently, the mixture M7 can flow into the loosening unit 18 in the state in which the fragment M6 and the complex C10 are uniformly dispersed. In addition, the fragment M6 in the mixture M7 is loosened to finer fibers in the process of passing through the tube 172.

The loosening unit 18 is a section for performing the loosening step of loosening individual fibers that are intertwined with each other in the mixture M7. The loosening unit 18 includes a drum section 181 and a housing section 182 accommodating the drum section 181.

The drum section 181 is a sieve that is constituted of a cylindrically shaped net and rotates around the central axis thereof. The mixture M7 flows into this drum section 181. In the mixture M7, individual fibers, etc. smaller than the opening of the net can pass through the drum section 181 by the rotation of the drum section 181. On this occasion, the mixture M7 is loosened.

The mixture M7 loosened in the drum section 181 falls while being dispersed in air toward the second web forming unit 19 which is located below the drum section 181. The second web forming unit 19 is a section performing the second web forming step of forming a second web M8 from the mixture M7. The second web forming step in the present embodiment is a deposition step of depositing a mixture including the fiber and the complex C10. The second web forming unit 19 includes a mesh belt 191 serving as a separation belt, stretching rollers 192, and a suction section 193.

The mesh belt 191 is an endless belt, and the mixture M7 deposits thereon. This mesh belt 191 is put around four stretching rollers 192. The mixture M7 on the mesh belt 191 is transported to the downstream by rotary drive of the stretching rollers 192.

Most of the mixture M7 on the mesh belt 191 has a size of equal to or larger than the opening of the mesh belt 191. Consequently, the mixture M7 is restricted from passing through the mesh belt 191 and can deposit on the mesh belt 191. In addition, the mixture M7 is transported to the downstream together with the mesh belt 191 while being deposited on the mesh belt 191 and is therefore formed into a layered second web M8.

The suction section 193 can suck air from the below of the mesh belt 191. Consequently, the mixture M7 can be sucked on the mesh belt 191, and deposition of the mixture M7 on the mesh belt 191 is promoted.

The suction section 193 is connected to a tube 246 serving as a flow channel. In addition, in the middle of this tube 246, a blower 263 is provided. A suction force can be generated in the suction section 193 by operation of this blower 263.

The housing section 182 is connected to the humidification unit 234. The humidification unit 234 is constituted of a vaporization humidifier similar to the humidification unit 231. Consequently, humidified air is supplied to the inside of the housing section 182. The inside of the housing section 182 is humidified by this humidified air, and thereby the mixture M7 can be prevented from adhering to the inner wall of the housing section 182 by an electrostatic force.

The humidification unit 236 is disposed on the downstream of the loosening unit 18. The humidification unit 236 is a section for performing the above-described humidification step. The humidification unit 236 is constituted of an ultrasonic humidifier similar to the humidification unit 235. Consequently, moisture can be supplied to the second web M8, and the amount of moisture in the second web M8 is adjusted. This adjustment can optimize the binding force between the fiber and the binding material in the sheet S as the finally obtained molded product. In addition, the second web M8 can be prevented from attaching to the mesh belt 191 by an electrostatic force. Consequently, the second web M8 is easily peeled off from the mesh belt 191 at the position where the mesh belt 191 is folded back by the stretching rollers 192.

The sheet forming unit 20 is disposed on the downstream of the second web forming unit 19. The sheet forming unit 20 is a section for performing the sheet forming step which is a molding step of forming a sheet S from the second web M8. This sheet forming unit 20 includes a pressurization section 201 and a heating section 202.

The pressurization section 201 includes a pair of calender rollers 203 and can pressurize the second web M8 therebetween without heating. Consequently, the density of the second web M8 is increased. This second web M8 is transported toward the heating section 202. Incidentally, one of the pair of calender rollers 203 is a driving roller that is driven by operation of a motor (not shown), and the other is a driven roller.

The heating section 202 includes a pair of heating rollers 204 and can pressurize the second web M8 therebetween while heating. The complex C10 is melted in the second web M8 by this heating and pressurization, and individual fibers are bound to each other through this melted complex C10. Consequently, a sheet S is formed as a molded product. This sheet S is transported toward the cutting unit 21. Incidentally, one of the pair of heating rollers 204 is a driving roller that is driven by operation of a motor (not shown), and the other is a driven roller.

The cutting unit 21 is disposed on the downstream of the sheet forming unit 20. The cutting unit 21 is a section for performing the cutting step of cutting the sheet S. This cutting unit 21 includes a first cutter 211 and a second cutter 212.

The first cutter 211 cut the sheet S in a direction intersecting the transport direction of the sheet S.

The second cutter 212 cut the sheet S in a direction parallel to the transport direction of the sheet S on the downstream of the first cutter 211.

A sheet S as a molded product with a desired size can be obtained by the cutting with the first cutter 211 and the second cutter 212. This sheet S is further transported to the downstream and is stored in the stock unit 22.

3. Molded Product

The molded product according to the present disclosure will be then described.

The molded product according to the present disclosure is manufactured using the method for manufacturing a molded product of the present disclosure described above.

Consequently, a molded product including a fiber and also having excellent strength can be provided.

The fiber, the binding material, and the inorganic particle included in the molded product according to the present disclosure may be those satisfying the same conditions as described in the paragraphs "1-1-1", "1-1-2-1-1", and "1-1-2-1-2", respectively.

The shape of the molded product according to the present disclosure is not particularly limited and may be any shape, such as sheet-like, block-like, spherical, and three-dimensional solid shapes. The molded product according to the present disclosure may be in a sheet-like shape. Incidentally, the term "sheet-like" here refers to a molded product molded so as to have a thickness of 30 μm or more and 30 mm or less and a density of 0.05 g/cm$^3$ or more and 1.5 g/cm$^3$ or less.

Consequently, for example, the molded product can be suitably used as a recording medium, etc. In addition, more efficient manufacturing is possible by using an apparatus as described above.

When the molded product according to the present disclosure is a sheet-like recording medium, the thickness thereof may be 30 μm or more and 3 mm or less.

Consequently, the molded product can be more suitably used as a recording medium. In addition, more efficient manufacturing is possible by using an apparatus as described above.

When the molded product according to the present disclosure is a sheet-like recording medium, the density thereof may be 0.6 g/cm$^3$ or more and 0.9 g/cm$^3$ or less.

Consequently, the molded product can be more suitably used as a recording medium.

The molded product according to the present disclosure may further include an additional portion as long as it is at least partially manufactured by applying the method for manufacturing a molded product of the present disclosure described above. Furthermore, after the steps described in the method for manufacturing a molded product of the present disclosure, the molded product may be subjected to a post treatment.

The use of the molded product according to the present disclosure is not particularly limited, and examples thereof include a recording medium, a liquid absorber, a buffer material, and a sound absorber.

Preferred embodiments of the present disclosure have been described above, but the present disclosure is not limited thereto.

For example, in the above-described embodiments, the case in which the complex includes a composite particle composed of a binding material particle and an inorganic particle adhered to the surface of the binding material particle has been mainly described, but the complex need not include the composite particle as described above as long as the composite particle includes a binding material particle and an inorganic particle.

In addition, in the above-described embodiments, the case in which the inorganic particle constituting the complex is prepared by a surface treatment of a mother particle constituted of an inorganic material with a surface treatment agent has been mainly described, but the inorganic particle need not be subjected to a surface treatment with a surface treatment agent. In this case, the inorganic particle may satisfy the same conditions as described in the paragraph "1-1-2-1-2-1" above.

Each unit constituting the sheet-manufacturing apparatus can be replaced with any configuration that can exert the same function. In addition, any component may be added to the apparatus.

The molded product according to the present disclosure is not limited to those manufactured with the above-described apparatus and may be manufactured with any apparatus.

EXAMPLES

Specific examples of the present disclosure will now be described.

4. Preparation of Complex

Preparation Example 1

Starch (NSP-EA, manufactured by Nippon Starch Chemical Co., Ltd.) as a binding material having a weight average molecular weight of 100,000 was pulverized to an average particle diameter of 3.0 μm using a pulverizer (counter jet mill AFG-CR, manufactured by Hosokawa Micron Corp.).

Subsequently, this pulverized product of starch was loaded in a Henschel mixer (FM mixer (FM 20C/I), manufactured by Nippon Coke & Engineering Co., Ltd.), and 1 part by mass of fumed silica (DM-10, manufactured by Tokuyama Corporation) including a dimethylsilyl group on the surface was added thereto as an inorganic particle based on 100 parts by mass of the starch, followed by a stirring treatment at a rotation speed of 6000 rpm for 1 hour to prepare a complex.

The thus-obtained complex included a composite particle composed of the starch particle as a binding material particle and the fumed silica as an inorganic particle adhered to the surface of the starch particle. The inorganic particle included in the complex had an average particle diameter of 14 nm, and the binding material particle included in the complex had an average particle diameter of 3.0 μm.

Preparation Examples 2 to 15

Complexes were prepared as in Preparation Example 1 except that the types of the binding material and the inorganic particle as raw materials were those shown in Table 1 and that the pulverization conditions of the binding material and the compounding ratio of the binding material particle and the inorganic particle were adjusted to give the configurations shown in Table 1.

The complexes were prepared as in Preparation Example 1 except that the types of the binding material and the inorganic particle as raw materials were those shown in Table 1 and that the pulverization conditions of the binding material were adjusted to give the configurations shown in Table 1.

The configurations of the complexes obtained in the Preparation Examples are collectively shown in Table 1. Incidentally, in Table 1, "NSP-EA" means starch (NSP-EA, manufactured by Nippon Starch Chemical Co., Ltd.) having a weight average molecular weight of 100,000, "MF-30" means dextrin (MF-30, manufactured by Nippon Starch Chemical Co., Ltd.) having a weight average molecular weight of 20,000, "SF-930" means soft starch (SF-930, manufactured by Sanwa Starch Co., Ltd.) having a weight average molecular weight of 600,000, "DM-10" means fumed silica (DM-10, manufactured by Tokuyama Corporation) that is an inorganic particle including a dimethylsilyl group on the surface and having an average particle diameter of 14 nm, "HM-30S" means fumed silica (HM-30S, manufactured by Tokuyama Corporation) that is an inorganic particle including a trimethylsilyl group on the surface and having an average particle diameter of 7 nm, "ZD-30ST" means fumed silica (ZD-30ST, manufactured by Tokuyama Corporation) that is an inorganic particle including a trimethylsilyl group on the surface and having an average particle diameter of 7 nm, "AluC" means fumed alumina (AEROXIDE Alu-C, manufactured by Nippon Aerosil Co., Ltd.) that is an inorganic particle including a trimethylsilyl group on the surface and having an average particle diameter of 7 nm, and "NKT90" means fumed titania (AEROXIDE NKT 90, manufactured by Nippon Aerosil Co., Ltd.) that is an inorganic particle including a trimethylsilyl group on the surface and having an average particle diameter of 7 nm. In addition, in Table 1, a composition consisting of only a binding material particle having an average particle diameter 10 µm prepared according to the explanation in Preparation Example 1 is shown as Preparation Example 16. Incidentally, in all of Preparation Examples 1 to 15 above, the proportion of the binding material particle constituting the composite particle to the total binding material particle included in the complex was 90 mass % or more, and the proportion of the inorganic particle constituting the composite particle to the total inorganic particle included in the complex was 90 mass % or more.

manufacturing apparatus, the complex prepared in Preparation Example 1 was supplied to the complex supply section, and the sheet-manufacturing apparatus was driven to perform a coarse crushing step, a defibration step, a sorting step, a first web forming step, a segmentation step, a mixing step, a loosening step, a second web forming step as a deposition step, a humidification step, a sheet forming step as a molding step, and a cutting step. Thus, an A4 size sheet was manufactured as a molded product. The resulting sheet had a basis weight of 90 g/m$^2$.

On this occasion, the sheet as the finally obtained molded product was adjusted to include 10 parts by mass of the complex based on 90 parts by mass of the fiber as a raw material. In addition, the humidification step was adjusted such that 20 parts by mass of moisture was applied to 100 parts by mass of the mixture subjected to the humidification step. In addition, the heating temperature when heating and pressurization were performed in the heating section was 80° C., the pressure when heating and pressurization were performed in the heating section was 70 MPa, and the heating and pressurization time when heating and pressurization were performed in the heating section was 15 seconds.

Examples 2 to 16

A4 size sheets were manufactured as molded products as in Example 1 except that those shown in Table 2 were used

TABLE 1

| | Binding material particle | | | | | Inorganic particle | | | |
|---|---|---|---|---|---|---|---|---|---|
| | Type of binding material | Composition | Weight average molecular weight | Average particle diameter [µm] | Content [mass %] | Type | Composition of mother particle | Surface treatment | Average particle diameter [nm] | Content [mass %] |
| Preparation Example 1 | NSP-EA | Starch | 100,000 | 3.0 | 99.0 | DM-10 | Silica | Dimethylsilyl | 14 | 1.0 |
| Preparation Example 2 | NSP-EA | Starch | 100,000 | 10.0 | 99.0 | DM-10 | Silica | Dimethylsilyl | 14 | 1.0 |
| Preparation Example 3 | NSP-EA | Starch | 100,000 | 25.0 | 99.0 | DM-10 | Silica | Dimethylsilyl | 14 | 1.0 |
| Preparation Example 4 | NSP-EA | Starch | 100,000 | 30.0 | 99.0 | DM-10 | Silica | Trimethylsilyl | 14 | 1.0 |
| Preparation Example 5 | NSP-EA | Starch | 100,000 | 10.0 | 99.0 | HM-30S | Silica | Trimethylsilyl | 7 | 1.0 |
| Preparation Example 6 | NSP-EA | Starch | 100,000 | 10.0 | 99.0 | ZD-30ST | Silica | Trimethylsilyl | 7 | 1.0 |
| Preparation Example 7 | NSP-EA | Starch | 100,000 | 10.0 | 99.5 | ZD-30ST | Silica | Trimethylsilyl | 7 | 0.5 |
| Preparation Example 8 | NSP-EA | Starch | 100,000 | 10.0 | 95.0 | ZD-30ST | Silica | Trimethylsilyl | 7 | 5.0 |
| Preparation Example 9 | NSP-EA | Starch | 100,000 | 10.0 | 99.8 | ZD-30ST | Silica | Trimethylsilyl | 7 | 0.2 |
| Preparation Example 10 | NSP-EA | Starch | 100,000 | 10.0 | 93.0 | ZD-30ST | Silica | Trimethylsilyl | 7 | 7.0 |
| Preparation Example 11 | NSP-EA | Starch | 100,000 | 40.0 | 99.0 | DM-10 | Silica | Dimethylsilyl | 14 | 1.0 |
| Preparation Example 12 | MF-30 | Dextrin | 20,000 | 10.0 | 99.0 | HM-30S | Silica | Trimethylsilyl | 7 | 1.0 |
| Preparation Example 13 | SF-930 | Starch | 600,000 | 10.0 | 99.0 | HM-30S | Silica | Trimethylsilyl | 7 | 1.0 |
| Preparation Example 14 | NSP-EA | Starch | 100,000 | 10.0 | 99.0 | AluC | Alumina | Trimethylsilyl | 7 | 1.0 |
| Preparation Example 15 | NSP-EA | Starch | 100,000 | 10.0 | 99.0 | NKT90 | Titania | Trimethylsilyl | 7 | 1.0 |
| Preparation Example 16 | NSP-EA | Starch | 100,000 | 10.0 | 100.0 | — | — | — | — | — |

5. Manufacturing Sheet as Molded Product

Example 1

In the present Example, a sheet as a molded product was manufactured using the complex prepared in Preparation Example 1 as follows.

First, a sheet-manufacturing apparatus as shown in FIG. 2 was prepared, and commercially available copy paper (GR70-W, manufactured by FUJIFILM Business Innovation Corp.) was prepared as a sheet-like material serving as a fiber source.

Subsequently, the sheet-like material prepared above was supplied to the raw material supply unit of the sheetas the complexes and that the amount of moisture applied to 100 parts by mass of the second web formed by deposition of a mixture of the fiber and the complex, i.e., in the humidification step, the amount of moisture applied to 100 parts by mass of the mixture subjected to the humidification step was adjusted to those shown in Table 2.

Comparative Example 1

An A4 size sheet was manufactured as a molded product as in Example 2 except that humidification for the second web formed by deposition of the mixture of a fiber and a complex was omitted.

Comparative Example 2

An A4 size sheet was manufactured as a molded product as in Example 1 except that, instead of the complex, the composition of Preparation Example 16, i.e., a composition consisting of only a binding material particle having an average particle diameter of 10 μm prepared according to the explanation in Preparation Example 1, was used.

The conditions for manufacturing the molded products of Examples and Comparative Examples are collectively shown in Table 2.

TABLE 2

| | Used complex | Humidification condition in humidification step Moisture amount applied to 100 parts by mass of mixture [part by mass] |
|---|---|---|
| Example 1 | Preparation Example 1 | 20 |
| Example 2 | Preparation Example 2 | 20 |
| Example 3 | Preparation Example 3 | 20 |
| Example 4 | Preparation Example 4 | 20 |
| Example 5 | Preparation Example 5 | 20 |
| Example 6 | Preparation Example 6 | 20 |
| Example 7 | Preparation Example 7 | 20 |
| Example 8 | Preparation Example 8 | 20 |
| Example 9 | Preparation Example 9 | 20 |
| Example 10 | Preparation Example 10 | 20 |
| Example 11 | Preparation Example 11 | 20 |
| Example 12 | Preparation Example 6 | 40 |
| Example 13 | Preparation Example 12 | 20 |
| Example 14 | Preparation Example 13 | 20 |
| Example 15 | Preparation Example 14 | 20 |
| Example 16 | Preparation Example 15 | 20 |
| Comparative Example 1 | Preparation Example 2 | 0 |
| Comparative Example 2 | Preparation Example 16 | 20 |

6. Evaluation

6-1. Strength of Molded Product

A strip of 100 mm×20 mm was cut out from each sheet manufactured in each Example and each Comparative Example as a molded product, and the breaking strength of the strip in the longitudinal direction was measured. The breaking strength was measured using Autograph AGS-1N manufactured by Shimadzu Corporation at a tension rate of 20 mm/sec, and the specific tensile strength was calculated therefrom and was evaluated based on the following criteria. It can be said that the larger the specific tensile strength, the better the strength.

A: the specific tensile strength is 25 Nm/g or more,
B: the specific tensile strength is 20 Nm/g or more and less than 25 Nm/g,
C: the specific tensile strength is 15 Nm/g or more and less than 20 Nm/g,
D: the specific tensile strength is 10 Nm/g or more and less than 15 Nm/g, and
E: the specific tensile strength is less than 10 Nm/g.

6-2. Fluidity

The angle of rest and the compression degree were measured for the complexes used for manufacturing the molded products in Examples and Comparative Example 1 and the composition consisting of the binding material particle used for manufacturing the molded product in Comparative Example 2, using a powder characteristics evaluation device (Powder Tester PT-X, manufactured by Hosokawa Micron Corp.).

From these measurement results, the fluidity value, which is the product of an angle of rest [°] and a compression degree [%], was determined and was evaluated based on the following criteria. It can be said that the smaller the fluidity value, the better the fluidity.

A: the fluidity value is less than 10,
B: the fluidity value is 10 or more and less than 12,
C: the fluidity value is 12 or more and less than 14,
D: the fluidity value is 14 or more and less than 17, and
E: the fluidity value is 17 or more.

These results are collectively shown in Table 3.

TABLE 3

| | Breaking strength | Powder fluidity |
|---|---|---|
| Example 1 | C | C |
| Example 2 | B | C |
| Example 3 | B | C |
| Example 4 | C | C |
| Example 5 | A | A |
| Example 6 | A | A |
| Example 7 | B | B |
| Example 8 | B | A |
| Example 9 | D | D |
| Example 10 | C | A |
| Example 11 | D | A |
| Example 12 | D | A |
| Example 13 | B | A |
| Example 14 | C | A |
| Example 15 | A | B |
| Example 16 | A | B |
| Comparative Example 1 | E | C |
| Comparative Example 2 | E | E |

As obvious from Table 3, excellent results were obtained in the present disclosure. In contrast, in Comparative Examples, no satisfactory results were obtained.

In addition, complexes were manufactured as in Examples described above except that the mixing ratio of the fiber and the complex in the deposition step was variously changed such that the content of the complex in the mixture obtained in the deposition step was 1 mass % or more and 50 mass % or less. These complexes were evaluated as in above, and the results obtained were similar to the above. In addition, complexes were manufactured as in Examples above except that the heating temperature in the molding step was changed within a range of 60° C. or more and 250° C. or less. These complexes were evaluated as in above, and the results obtained were similar to the above. In addition, complexes were manufactured as in Examples above except that the pressure applied to the mixture in the molding step was changed within a range of 0.1 MPa or more and 100 MPa or less. These complexes were evaluated as in above, and the results obtained were similar to the above. In addition, complexes were manufactured as in Examples above except that the heating and pressurization time in the molding step was changed within a range of 1 second or more and 60 seconds or less. These complexes were evaluated as in above, and the results obtained were similar to the above.

What is claimed is:

1. A method for manufacturing a molded product, comprising:
    a deposition step of depositing a mixture including fibers and a complex;
    a humidification step of humidifying the mixture by applying a moisture to the mixture; and a molding step of heating and pressurizing the humidified mixture to obtain a molded product, wherein the complex includes a binding material particle containing starch, and an inorganic particle adhered to the binding material particle, and the binding material particle exerts a binding force, for binding the fibers, accompanying with gelatinization of the starch by the heating after the applying of the moisture, the inorganic particle including a mother particle and a coating layer of a surface treatment agent that coats the mother particle, and a content of the surface treatment agent based on 100 parts by mass of the mother particle included in the complex being 0.5 parts by mass or more and 7 parts by mass or less.

2. The method for manufacturing a molded product according to claim 1, wherein
the starch has a weight average molecular weight of 50,000 or more and 400,000 or less.

3. The method for manufacturing a molded product according to claim 1, wherein
the binding material particle has an average particle diameter of 1.0 μm or more and 50 μm or less.

4. The method for manufacturing a molded product according to claim 1, wherein
the mother particle of the inorganic particle is constituted of a material including silica.

5. The method for manufacturing a molded product according to claim 1, wherein
the inorganic particle has an average particle diameter of 1 nm or more and 20 nm or less.

6. The method for manufacturing a molded product according to claim 1, wherein
the complex includes a composite particle in which the inorganic particle adheres to the surface of the binding material particle.

7. The method for manufacturing a molded product according to claim 1, wherein
a content of the inorganic particle in the complex is 0.1 mass % or more and 10.0 mass % or less.

8. The method for manufacturing a molded product according to claim 1, wherein
the surface treatment agent of the inorganic particle includes a trimethylsilyl group.

9. The method for manufacturing a molded product according to claim 1, wherein
the humidification step applies 1 part by mass or more and 50 parts by mass or less of moisture to 100 parts by mass of the mixture subjected to the humidification step.

10. The method for manufacturing a molded product according to claim 1, wherein
a content of the complex in the mixture is 1 mass % or more and 50 mass % or less.

* * * * *